(12) United States Patent
Kemmler (10) Patent No.: US 9,069,645 B2
(45) Date of Patent: Jun. 30, 2015

(54) DECOUPLED DEVELOPMENT IN A SHARED DEVELOPMENT SYSTEM

(75) Inventor: Andreas Kemmler, Bönnigheim (DE)

(73) Assignee: SAP SE, Walldorf (DE)

( * ) Notice: Subject to any disclaimer, the term of this patent is extended or adjusted under 35 U.S.C. 154(b) by 1208 days.

(21) Appl. No.: 12/956,599

(22) Filed: Nov. 30, 2010

(65) Prior Publication Data
US 2012/0137271 A1    May 31, 2012

(51) Int. Cl.
G06F 9/44    (2006.01)

(52) U.S. Cl.
CPC ... G06F 8/72 (2013.01); G06F 8/20 (2013.01)

(58) Field of Classification Search
None
See application file for complete search history.

(56) References Cited

U.S. PATENT DOCUMENTS

| | | | |
|---|---|---|---|
| 6,028,998 A * | 2/2000 | Gloudeman et al. | 717/108 |
| 6,532,588 B1 * | 3/2003 | Porter | 717/170 |
| 7,093,264 B2 * | 8/2006 | Choi et al. | 719/316 |
| 2002/0013938 A1 * | 1/2002 | Duesterwald et al. | 717/9 |
| 2003/0122867 A1 * | 7/2003 | Choi et al. | 345/748 |
| 2003/0163479 A1 * | 8/2003 | Mathews et al. | 707/102 |
| 2007/0150855 A1 * | 6/2007 | Jeong | 717/106 |
| 2008/0148230 A1 * | 6/2008 | Kemmler | 717/120 |
| 2009/0328020 A1 * | 12/2009 | Stall et al. | 717/160 |

OTHER PUBLICATIONS

Taylor et al. "A Component- and Message-based architectural style for GUI software", 1995, Proceedings of the 17th international conference on software engineering, pp. 295-304.*

Medvidovic et al. "Reuse of Off-the-shelf components in C2-style Architectures", 1997, Proceedings of the 1997 symposium on Software Reusability, pp. 190-198.*

* cited by examiner

*Primary Examiner* — Jason Mitchell
(74) *Attorney, Agent, or Firm* — Kenyon & Kenyon LLP (57) ABSTRACT

A computer-implemented method of optimizing software components. The method may include receiving a software component including a layered hierarchy of structure packages, main packages, and common packages each including objects, grouping common packages into groups according to pre-determined criteria, encapsulating each group with an encapsulation package, wherein the encapsulation package is one of a structure package and a main package, allowing objects in the encapsulation package to communicate directly by bypassing common packages in the encapsulation package, and eliminating package interfaces of the common packages in the encapsulation package that are solely used for communicating with other common packages in the encapsulation package.

17 Claims, 9 Drawing Sheets

DECOUPLED DEVELOPMENT IN A SHARED DEVELOPMENT SYSTEM

FIELD OF THE INVENTION

The present invention is directed to methods and systems of decoupling software component developed in a shared development environment to reduce packaging errors.

BACKGROUND

Procurement of complex business applications trends toward on-demand and as-needed purchases. Instead of purchasing major releases of a business application every five years or so, a customer may selectively purchase from an annual enhancement package based on its business needs. The customer may choose and purchase components of specific functionalities from the enhancement package for immediate deployment at a reduced cost. Thus, the customer may enhance its business application capabilities timely without incurring unnecessary expenses.

Current art of software application development may not be adequate to meet demands of this new trend. A problem with business software applications developed using current art is that package errors may occur during packaging a business application. In a modular program, packaging software is the process of creating packages (or software components) that may be integrated into a primary application program. Currently, complex business applications such as Enterprise Resource Planning (ERP) applications are commonly developed in a shared development environment under which basic software modules such as objects developed by application developers may be shared and reused in different software components. The shared development environment may reduce the cost associated with developing a complex business application while still preserving consistency of the codes. However, when a customer may choose software components of specific functionalities from an enhancement package and deploy the custom-chosen components in an existing installment of a business application software, package errors may arise because these software components have been developed in a shared development environment without regards to the interrelations among objects and packages.

A large number of package errors may be generated when packaging complex business applications developed in a shared environment. A shared development system/environment means that more than one software components may be developed in that system/environment. For example, an SAP® ERP application may include more than 150,000 types of potential package errors. Most of these package errors may not be serious errors and thus may be ignored or corrected manually. However, some of the package errors may be serious and may require modifications of the business application. Unfortunately, current tools for error detection are incapable of differentiating minor package errors from major ones. On the other hand, it is not economical to develop complex business applications in a fully separate development environment—i.e., each package is developed independently from another. Therefore, there is a need to improve the current art of business application development in a shared development environment to reduce or eliminate package errors.

SUMMARY OF INVENTION

Embodiments of the present invention may include a computer-implemented method of optimizing software components. The method may include receiving a software component including a layered hierarchy of structure packages, main packages, and common packages each including objects, grouping common packages into groups according to pre-determined criteria, encapsulating each group with an encapsulation package, wherein the encapsulation package is one of a structure package and a main package, allowing objects in the encapsulation package to communicate directly by bypassing common packages in the encapsulation package, and eliminating package interfaces of the common packages in the encapsulation package that are solely used for communicating with other common packages in the encapsulation package.

BRIEF DESCRIPTION OF THE DRAWINGS OF THE EXAMPLE EMBODIMENTS

DETAILED DESCRIPTION OF THE EXAMPLE EMBODIMENTS

Figure 1:
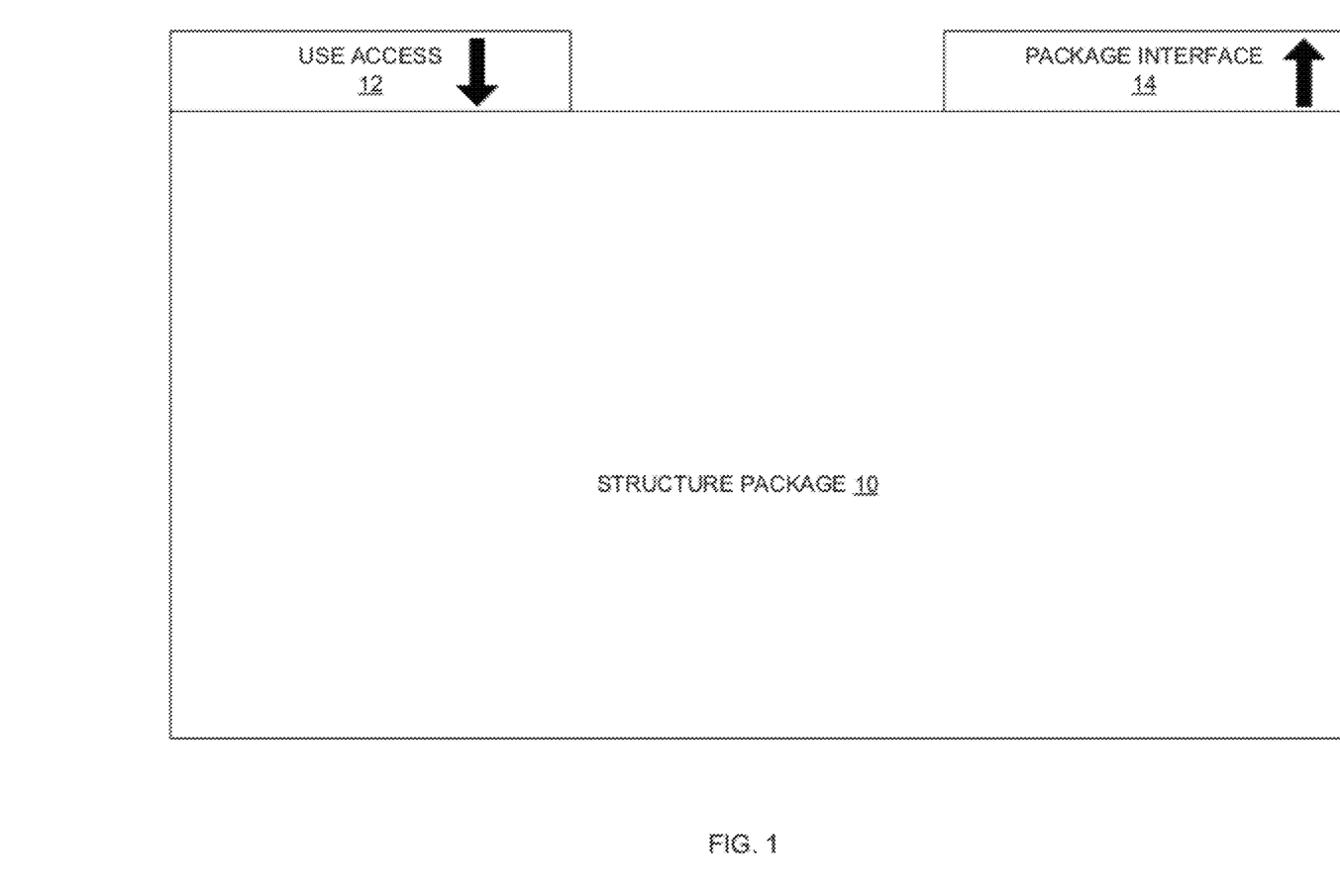
FIG. 1 illustrates a structure package.

Software components of business applications may include a layered hierarchy of packages and objects interrelated to perform certain functionalities. These layers of packages and objects may be developed in a shared development system and when interrelated, may constitute the business applications after the software packaging process. An upper layer in the hierarchy of packages and objects may contain lower layers of packages and objects. At a top layer, business applications may include structure packages. FIG. 1 illustrates a structure package 10 that may be deployed in a business application.

A structure package 10 may be a container that may include other lower level packages (such as main packages and common packages) but no objects. The structure package 10 may be further configured with one or more "package interface" 14 and one or more "use access" 12. A package interface is a set of components that are visible to outside packages. For the case of a structure package, its package interface may include a set of lower-level packages such as main packages or common packages contained in the structure package and may be visible to the outside of the structure package. Although a structure package may have more than one package interface, each package interface may correspond to only one structure package. In addition, the structure package 10 also may be configured with "use access" 12. A use access of a package may contain a list of package interfaces that are allowed to be used by the objects within the package. Thus, the use access 12 of a structure package 10 may control the access of objects within the structure package to outside packages. For example, the use access 12 may specify which package interfaces of outside packages the objects within the structure package 10 may use. Further, since the package interfaces specify which objects are visible, the combination of a package interface and a use access may define the allowable data communications between objects in different structure packages. Here, data communication between two objects means that one object may use the other object to achieve certain performance.

Figure 2A:
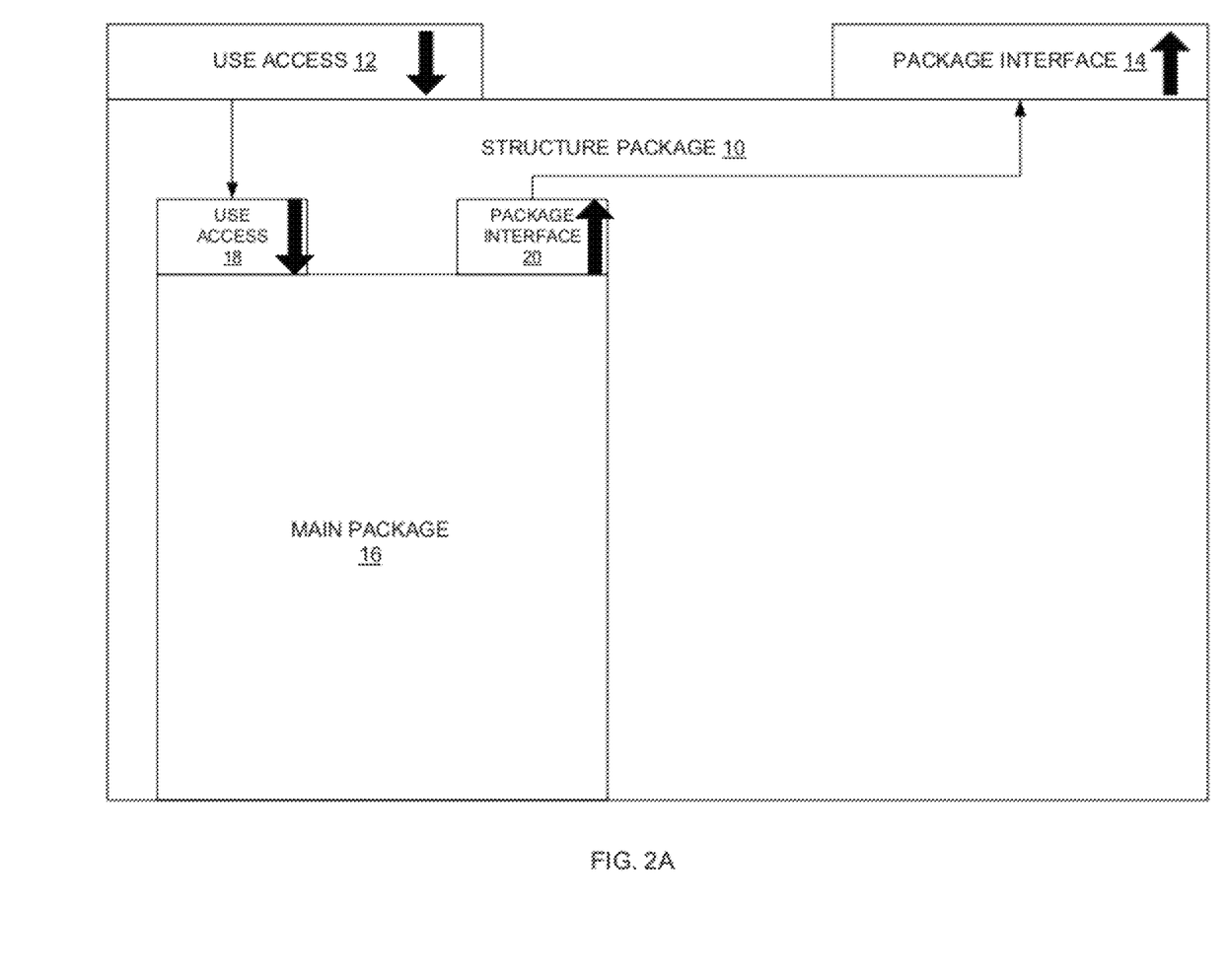
FIGS. 2A-B illustrate the structure package including one or more main package and their interconnections.

The structure package 10 may further include packages at lower levels of the hierarchy of packages and objects. FIG. 2A illustrates the structure package 10 including a main package and interconnections between the main package and the structure package 10. Similar to the structure package 10, the main package also may be a container that may include other same level or lower level packages (such as other main packages and common packages). Each main package may be configured with one or more package interfaces and use accesses. For example, main package 16 may include a package interface 20 and a use access 18. A package interface of a main package may include a set of same and/or lower level packages inside the main package that are visible to outside packages. A use access of a main package may specify a list of package interfaces that the objects within the main package may use.

Further, the use access 18 may be coupled to the use access 12 of its parent structure package 10 to control which package interfaces may be used by objects within the main package 16. For example, if the use access 18 specifies a first list of package interfaces such as package interfaces (A, B, C, D, E) and the use access 12 specifies a second list of package interfaces (A, B, C, F, G), then the intersection of the first and second lists (A, B, C) may be used by the objects within the main package 16. The package interface 20 of the main package 16 may include inside packages that are visible to outside. Further, the package interface 20 may be coupled to the package interface 14 of the parent structure package 10 for make the packages inside the main package visible to outside structure 10. For example, if package interface 20 of the main package 16 specifies objects (a, b, c, d, e) as visible to outside and package interface 14 of the structure package 10 specifies all objects within package interface 20 as visible, then objects (a, b, c, d, e) may be visible to packages outside the structure package 10. Thus, via the interconnection between the use access of the main package and structure package and the interconnection between the package interfaces of the main package and the structure package, the packages inside the main package may communicate with packages outside its parent structure package.

Figure 2B:
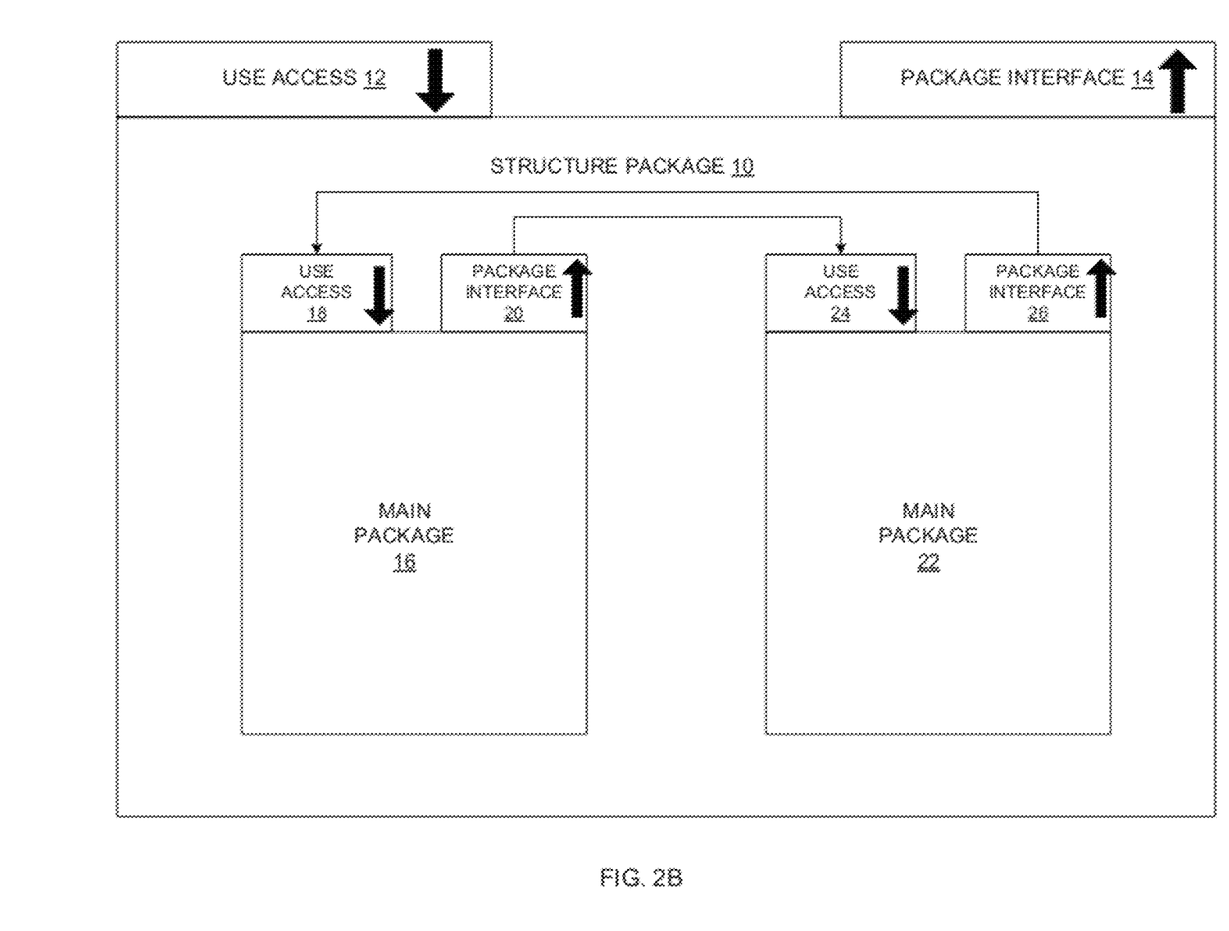

FIG. 2A illustrates an exemplary situation where the structure package 10 includes one main package 16. In other examples, the structure package 10 may include more than one main packages that communicate with each other via package interfaces and use accesses. FIG. 2B illustrates an exemplary situation where the structure package 10 includes two main packages 16 and 22. The second main package 22 may similarly include a use access 24 and a package interface 26. In addition to the coupling to the structure package 10 (not shown), the main packages 16 and 22 may communicate via their respect use accesses and package interfaces. For example, objects within main package 16 may use objects within main package 22 via the use access 18 of main package 16 and the package interface of main package 22. Similarly, the objects within main package 22 may use objects within main package 16 via the use access 24 of main package 22 and the package interface 20 of main package 16.

Figure 3A:
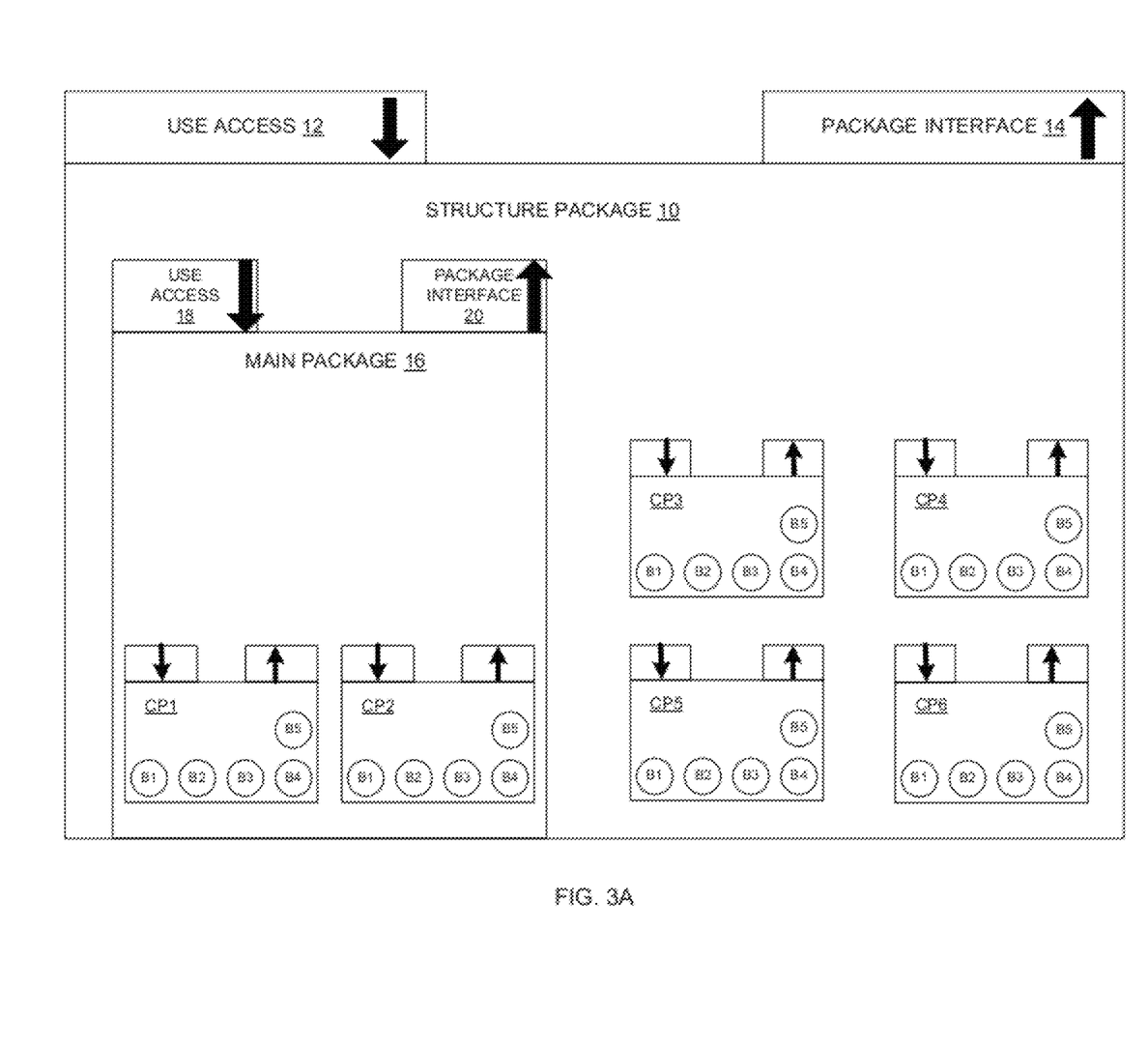
FIGS. 3A-B illustrate the structure package including the main package and common packages, and their interconnections.

In addition to main packages, the structure package 10 also may include common packages either directly or indirectly via main packages. The common packages may be a container that may include objects used for developing functionalities of a business application. Thus, the common packages may be packages at the lowest level. The objects within common packages may be the entities commonly understood in objected-oriented programming—i.e., a compilation of attributes (or object elements) and behaviors (or object methods or subroutines) that encapsulate the entity. FIG. 3A illustrates the exemplary structure package 10 including a mixture of main package 16 and a plurality of common packages. For clarity, FIG. 3A illustrates only components contained in the structure package 10 without their interconnections. The structure package 10 as illustrated in FIG. 3A may contain the main package 16 that in turn includes common packages CP1 and CP2. The structure package 10 also may directly contain common packages CP3 to CP6 without an intermediate main package. Each of the common packages CP1 to CP6 may further contain objects such as objects B1 to B5. The objects B1 to B5 are for illustration purpose. In practice, each of the common packages may contain different number of objects. Further, each of the common packages may respectively include one or more use access ("↑") and one or more package interface ("↓"). Similar to use accesses and package interfaces of a structure package or a main package, the package interface of a common package may include objects visible to outside the common package, and the use access of a common package may specifies a list of outside package interfaces that objects within the common package may use.

Figure 3B:
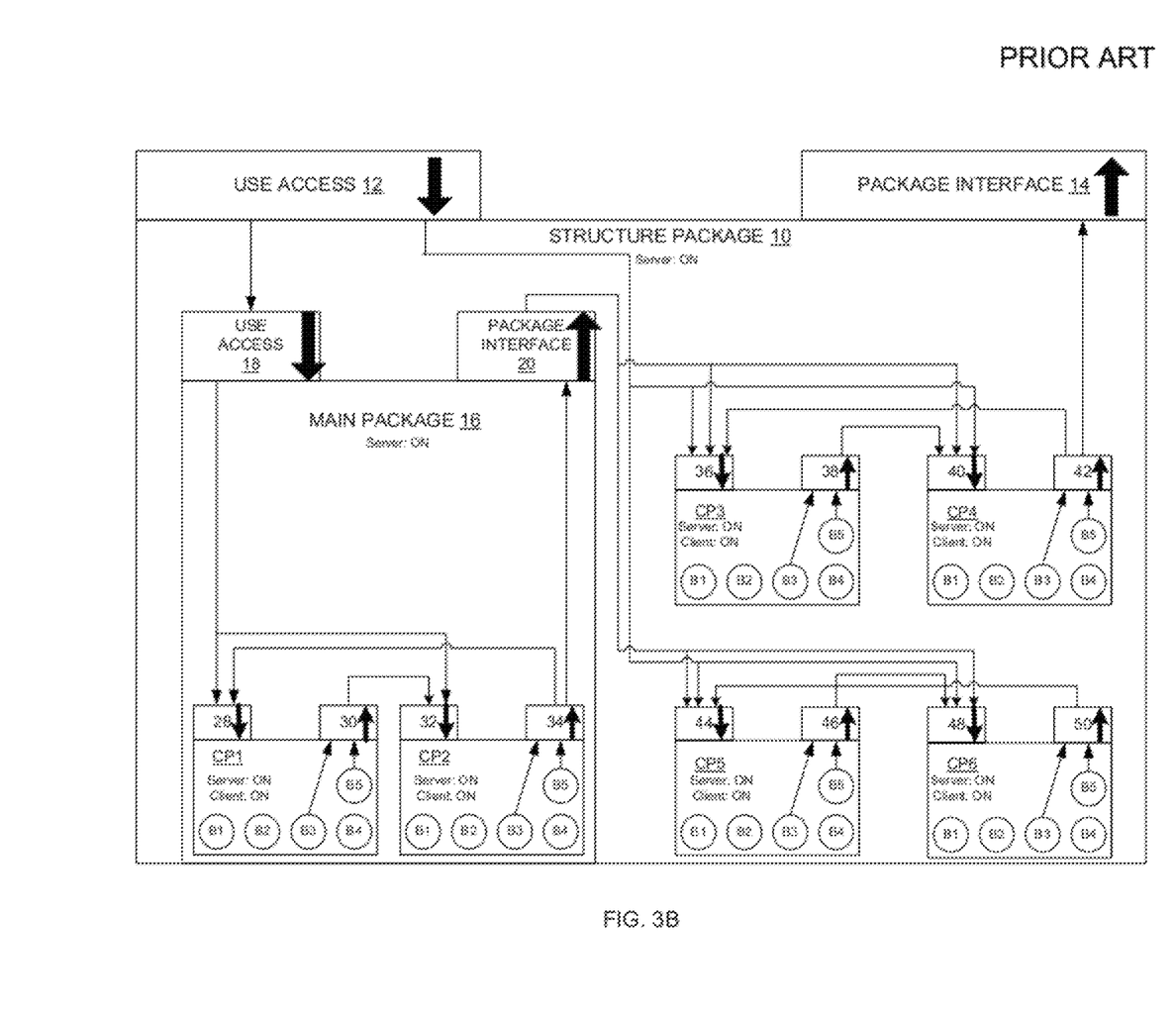

It is noted that the structure package 10 as illustrated in FIG. 3A at the layer of the structure package may contain a mixture of main package 16 and common packages CP3 to CP6 that may belong to different levels in the hierarchy of a business application. As they are mixed in the same layer, the main package 16 may directly communicate with common packages CP3 to CP6 without going through an intermediate main package. FIG. 3B illustrates communications among the structure package 10, main package 16, and common packages CP1 to CP6, as well as objects B1 to B5 inside common packages CP1 to CP6, via package interfaces and use accesses.

Each of the structure package 10, main package 16, and common packages CP1 to CP6 may include a server and/or a client property. The enablement of the server and/or client property of a package may turn on the package interface and use access so that communication to and from the package may need to go through its package interface and use access. In contrast, the disablement of the server and/or client property of a package may allow direct communications among packages within one encapsulated package without going through package interfaces. In this example of FIG. 3B, all of the server and/or client property of the structure package 10, main package 16, and common packages CP1 to CP6 are enabled, and therefore the communications among them may be controlled via package interfaces and use accesses.

The structure package 10 may include the main package 16 and common packages CP3 to CP6 that may communicate with each other. For example, package interface 20 of the main package 16 may include packages inside the main package 16 and visible to outside packages. In this example, package CP2 may be visible, and package CP1 may not be visible. At a further lower level inside common package CP2, the package interface 34 of CP2 may include objects B3 and B5. Thus, objects B3 and B5 may be visible to outside the main package 16 to common packages CP3 to CP6 via package interfaces 34 and 20. Common packages CP3 to CP6 may, via their respective use accesses 36, 40, 44, 48, specify which package interfaces the objects within common package CP3 to CP6 may use. For example as illustrated in FIG. 3B, the use access 36 of CP3 may include package interface 20, and thus objects B1 to B5 within CP3 may use the visible objects included in package interface 20. Therefore, objects B1 to B5 within CP3 may use objects B3 and B5 within CP2. Similarly, CP3 to CP6 may communicate with each other via package interfaces and use accesses. For example, the use access 36 of CP3 may further include permission to use package interface 42 of common package CP4 including objects B3 and B5 of CP4. Therefore, objects B1 to B5 within CP3 may use B3 and B5 of common package CP4.

The level within main package 16 may include common packages CP1 and CP2 that may communicate with each other via their respective package interfaces 30, 34 and use accesses 28, 32. For example, objects B1 to B5 within common package CP1 may use objects B3 and B5 within common package CP2.

FIG. 3B illustrates that the effort to maintain use accesses and package interfaces at the level of all common packages may be very high and error prone. For example, a typical ERP application may includes thousands of common packages. Further, it is noted that the restrictions on communications among common packages at a same hierarchical layer may be relaxed by bypassing their respective use accesses and/or package interfaces. In this way, the reduced number of interconnections among common packages may save costs associated with inter-connecting these common packages and drastically reduce error messages associated with the interconnections.

The relaxation of restriction on communications among common packages may be achieved by package encapsulation. Thus, common packages at a same layer in the hierarchy of a business application may be grouped so that each group of common packages may be encapsulated by a higher level package such as a main package or a structure package. Common packages within each encapsulated package may communicate with each other without going through their respective package interfaces and use accesses. However, to communicate with packages outside the encapsulating package, these common packages may still go through their respective package interfaces and use accesses.

Figure 4:
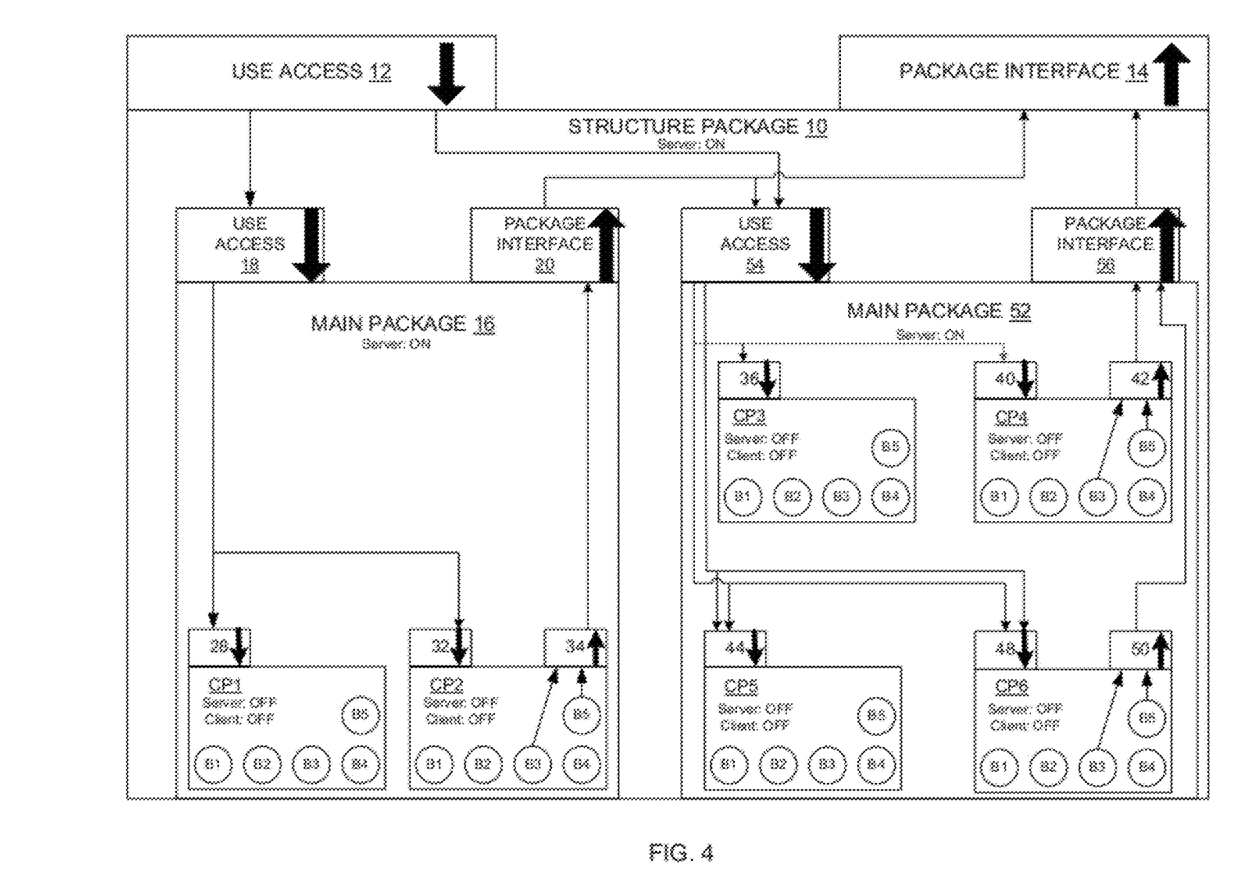
FIG. 4 illustrates an encapsulated structure package according to an embodiment of the present invention.

FIG. 4 illustrates an encapsulated structure package according to an embodiment of the present invention. In this example, structure package 10 may include main packages 16, 52. In this exemplary embodiment, common packages CP1 and CP2 may be encapsulated by main package 16, and common packages CP3 to CP6 may be encapsulated by a main package 52. The main packages 16, 52 may respectively include one or more use accesses 18, 54 and one or more package interfaces 54, 56. Within the encapsulating main package 16, both the server and client properties for common packages CP1 and CP2 may be disabled (or turned to OFF) so that objects inside common package CP1 may directly communicate with objects inside common package CP2 without checking visibility at package interfaces 30, 34 or permission at use accesses 28, 32. In this way, the checking for interconnections between common packages CP1 and CP2 may be eliminated, and the need for package interface 30 of CP1 also may be eliminated since it is solely used for communication with CP2. Similarly, within main package 52, the server and client properties for common package may be disabled (or turned to OFF) so that objects inside each common packages CP3 to CP6 may directly communicate with objects inside any other common packages CP3 to CP6. In this way, interconnections among CP3 to CP6 may be eliminated, and so are package interfaces 38, 46 since they are used solely for communications among common packages.

It is noted that communications between objects in different encapsulating packages may still need to use package interfaces and use accesses. For example, for objects inside the encapsulation main package 52 to use objects inside the encapsulation main package 16, the data communication may go through package interfaces 20 of main package 16 and use access 54 of main package 52. Further, package interfaces and use accesses may be needed for objects inside structure package 10 to communicate with objects outside structure package 10. Therefore, use accesses 28, 32, 36, 40, 44, 48 and package interfaces 34, 42, 50 that are used for communication with objects outside encapsulation layers may be preserved as illustrated in the exemplary embodiment of FIG. 4.

Figure 5:
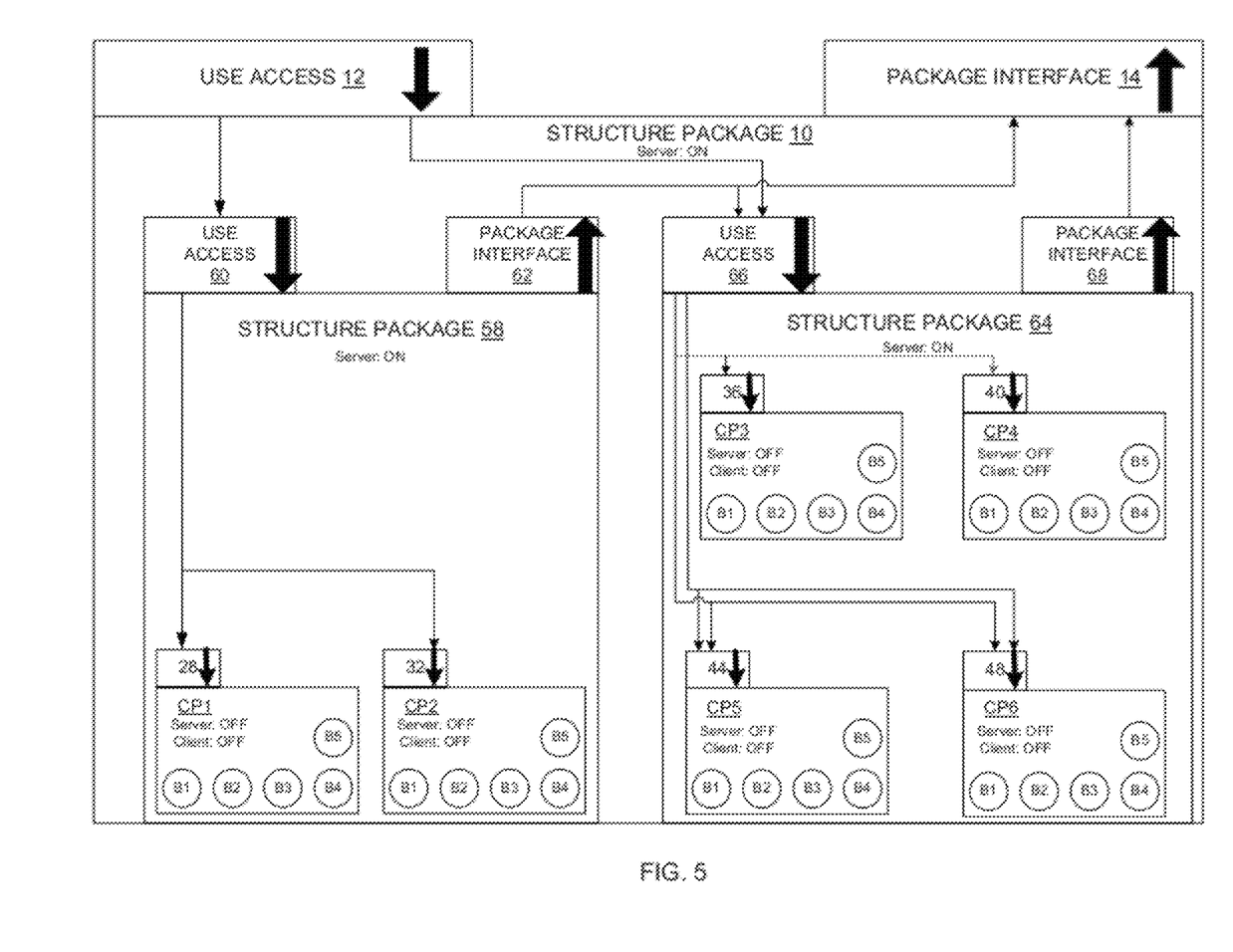
FIG. 5 illustrates another encapsulated structure package according to an embodiment of the present invention.

The interconnections among common packages may be further optimized by using properties of structure package. A structure package may offer default package interfaces that place objects inside the structure package into the default package interfaces of the encapsulating structure package. FIG. 5 illustrates using structure package as encapsulation layers to take advantage of their default interfaces according to an embodiment of the present invention. As illustrated in FIG. 5, instead of using main package to encapsulate, common packages CP1 and CP2 may be encapsulated by a structure package 58 that includes a use access 60 and default package interface 62, and common packages CP3 to CP6 may be encapsulated by a structure package 64 that includes a use access 66 and default package interface 68. Since the default package interface 62 already includes objects within structure package 58, the need for package interface 34 of common package CP2 may be eliminated. Similarly, the default package interface 68 may eliminate the need for package interfaces 42, 50 of common packages CP4, CP6. In this way, the interconnections among common packages may be further optimized and reduced.

Encapsulation packages used for reducing packaging errors may be further leveraged to decouple software components and thus further reduce the occurrences of packaging errors. In one exemplary embodiment of the present invention, the decoupling may include steps of identifying objects that may be accessible by other software components and keep these accessible objects stable. A software component may include a number of structure packages. Each structure package may include one or more package interface which may include visible objects in the structure package and accessible from outside. These objects may include objects that are accessible indirectly via package interfaces in sub packages and objects that are part of the virtual default package interface of the structure package. To this end, following tools may be created:

GET_STRUPACK_OF_SC (get structure packages of a software component). This function may return all structure packages of a given software component. Further, this function may return attributes of the returned structure packages including their use accesses and interface packages which may be needed to access objects inside structure packages.

GET_PINF_OF_STRUPAC (get package interface of structure package). This function may return all package interfaces of a given structure package.

GET_OBJECTS_OF_STRUPAC_PINF (get objects in package interfaces of a structure package). This function may return all objects that are part of package interfaces of a given structure package, including objects that are indirectly accessible via package interfaces of sub packages and objects accessible via the default package interface of the structure package.

The objects identified by these functions are those that could be used by other software components and should be kept stable to avoid packaging errors. Further, later-created new objects may not be used by other then-existing software components. The process to keep objects stable may be referred to as "freeze." A frozen object may not be changed. This can be achieved by the following function.

FREEZE_LIST_OF_OBJECTS. The imported list of objects after being frozen may not be changed. If a package is frozen, its package interface may not be changed. Any new objects should not appear in package interfaces.

Figure 6:
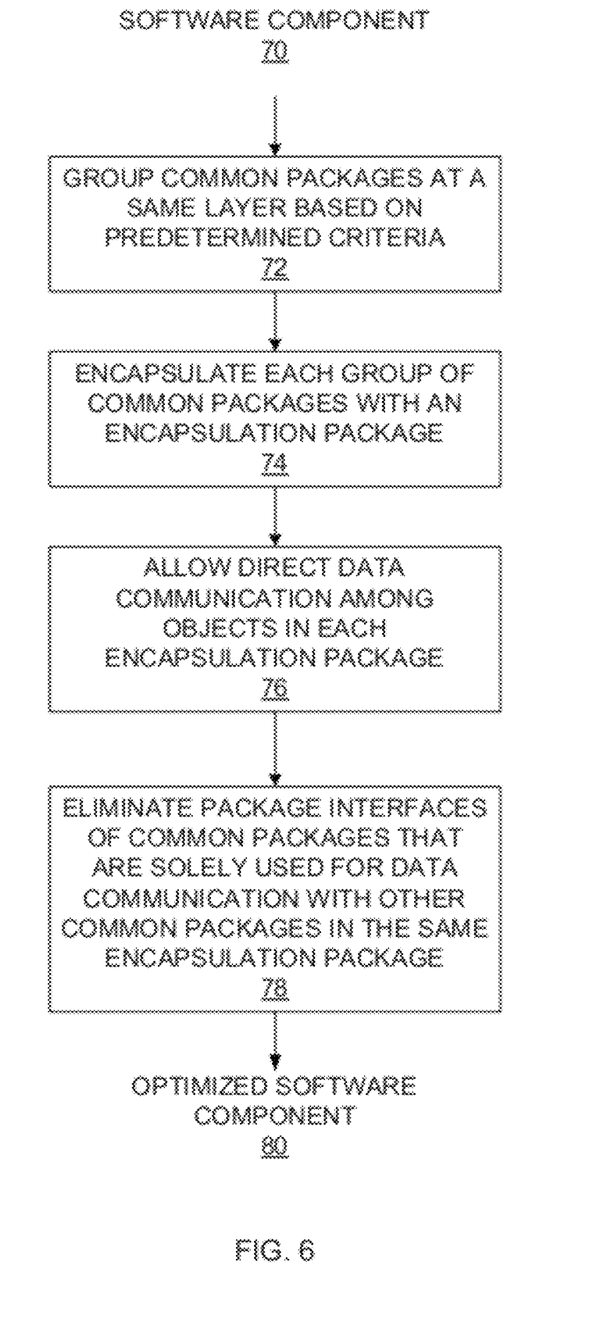
FIG. 6 illustrates a method of optimizing data communications among objects developed in a shared development environment using encapsulation packages according to an embodiment of the present invention.

FIG. 6 illustrates a method of optimizing data communications among objects developed in a shared development environment using encapsulation packages according to an embodiment of the present invention. A software component 70 in the form of computer-readable and executable code and stored in a non-transitory storage medium may be developed in a shared development environment and may include structure packages, main packages, common packages and objects as exemplarily illustrated in FIG. 3B. The structure packages, main packages, common packages and objects in the software component may be hierarchically organized in layers such that a structure package may include one or more main packages and one or more common packages, and a main package may include one or more common packages, and a common package may include one or more objects. Each structure package, main package, and common package may include one or more use access and package interface as described above. As such, each layer of the hierarchy may include one or more common packages containing objects.

At 72, common packages at a same layer may be grouped into groups based on pre-determined criteria. In one exemplary embodiment, all common packages within a main package or a structure package may be grouped into one group. At 74, each group of common packages may be encapsulated with an encapsulation package. The encapsulation package may be either a main package or a structure package. At 76, objects contained in the encapsulation package may be allowed to directly communicate with each other bypassing the package interfaces and access uses of the common packages. Thus, a first object in a first common package in the encapsulation package may use a second object in a second common package in the encapsulation package directly without checking the package interface of the second common package or the use access of the first common package. At 78, within each encapsulation package, package interfaces of common packages that are solely used for communicating with other common packages within the same encapsulation package may be identified and eliminated, which may result in an optimized software component that may generate fewer package errors.

The steps 72 to 78 may be carried out automatically by a computer or manually by a user. In one exemplary embodiment, a computer including a processor may execute codes to perform each of steps 72 to 78. Alternatively, a computer may generate a user interface through which a user may manual group common packages, pick a type of encapsulation package (either structure package or main package), and remove unnecessary package interfaces.

Figure 7:
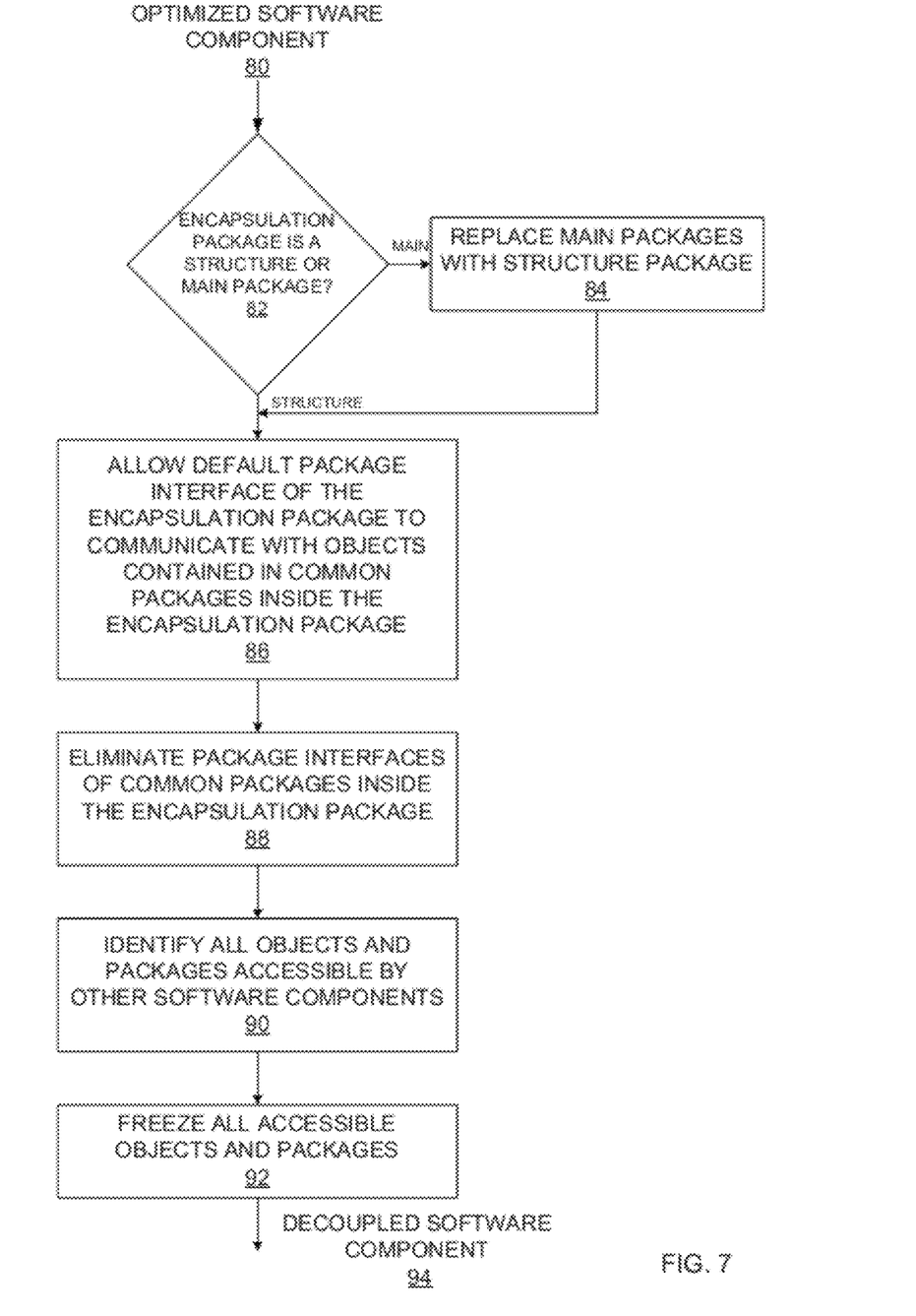
FIG. 7 illustrates a method of decoupling objects according to an embodiment of the present invention.

The optimized software component 80 may be further processed through a decoupling process for eventual deployment. FIG. 7 illustrates a method of decoupling objects according to an embodiment of the present invention. At 82, for an optimized software component, each encapsulation package may be determined to be a structure package or a main package. If it is a main package, at 84 the main package may be replaced with a structure package that includes a default package interface for communicating with objects in the structure package. Thus, after step 84, encapsulation packages within the software component may be structure packages. At 86, the default package interfaces of the encapsulation structure packages may be allowed to communicate with objects in the structure packages because the default interface of the structure package already may include all objects inside the structure package. The communication may include communication to objects through one layer of common package, or communication to objects indirectly through sub layer of encapsulation structure package. This default package interface of structure packages may eliminate the need for package interfaces at each common package. At 88, package interfaces of common packages in encapsulation structure packages may be removed.

At 90, all objects and packages may be accessible and used by other software components may be identified. The identification may be carried out using the above-described tools of GET_STRUPACK_OF_SC, GET_PINF_OF_STRUPAC, and GET_OBJECTS_OF_STRUPAC_PINF. Further, at 92, these identified objects and packages may be frozen for deployment. Thus, a user's pick-and-choose of software components from an Enhancement Package may not generate any kind of errors.

Although the present invention has been described with reference to particular examples and embodiments, it is understood that the present invention is not limited to those examples and embodiments. Further, those embodiments may be used in various combinations with and without each other. The present invention as claimed therefore includes variations from the specific examples and embodiments described herein, as will be apparent to one of skill in the art.

What is claimed is:

1. A computer-implemented method of optimizing software components, comprising:
receiving, by a processor, a software component including a layered hierarchy of:
structure packages containing lower level packages, wherein the structure packages form a root of the layered hierarchy;
main packages containing lower level packages; and
common packages each including objects to develop a functionality of a business application;
wherein the lower level packages include at least one of: the main packages and the common packages; and
wherein each of the structure packages, main packages, and common packages includes at least one package interface and at least one use access parameter, the at least one package interface and the at least one use access parameter defining visibility and access of respective packages;
grouping, by the processor, common packages at a same layer into groups according to pre-determined criteria;
encapsulating, by the processor, each group with an encapsulation package, wherein the encapsulation package is one of a structure package and a main package;
responsive to the encapsulation, allowing, by the processor, objects within the encapsulation package to communicate directly with one another without checking visibility at respective package interfaces and use access parameters; and
eliminating, by the processor, at least one of: the at least one package interface and the at least one use access parameter of the common packages in the encapsulation package.

2. The method of clam 1, wherein each structure package contains one or more main packages and one or more common packages.

3. The method of claim 1, wherein each main package contains one or more common packages.

4. The method of claim 1, wherein the each of the structure packages includes a default package interface that directly includes objects contained in the structure package.

5. The method of claim 1, wherein the software component is developed in a shared development environment.

6. The method of claim 1, further comprising:
   determining whether each encapsulation package is a structure package or a main package;
   if the encapsulation package is a main package, replacing the main package with a structure package including a default package interface;
   allowing default package interfaces of the encapsulation package to communicate with objects contained in the encapsulation package; and
   eliminating package interfaces of common packages contained in each encapsulation package.

7. The method of claim 6, further comprising:
   identifying all objects and packages that are used by other software components;
   freezing the all objects and packages that are used by other software components.

8. The method of claim 1, wherein the encapsulation includes disabling server and client properties for each group within the encapsulation package.

9. A computer-implemented method of optimizing software components, comprising:
   displaying, by a processor, a user interface depicting a layered hierarchy with at least one layer including common packages that include objects;
   responsive to a user interaction with the user interface, grouping common packages at a same hierarchical layer into groups;
   encapsulating, by the processor, each group with an encapsulation package, wherein the encapsulation package is one of a structure package and a main package;
   responsive to the encapsulation, allowing, by the processor, objects within the encapsulation package to communicate directly with one another without checking visibility at respective package interfaces and use access parameters; and
   eliminating, by the processor, at least one of: the package interfaces and the use access parameters of the common packages in the encapsulation package.

10. The method of claim 9, wherein each structure package contains one or more main packages and one or more common packages.

11. The method of claim 9, wherein each main package contains one or more common packages.

12. The method of claim 9, wherein the each of the structure packages includes a default package interface that directly includes objects contained in the structure package.

13. The method of claim 9, wherein the software component is developed in a shared development environment.

14. The method of claim 9, further comprising:
    determining whether each encapsulation package is a structure package or a main package;
    if the encapsulation package is a main package, replacing the main package with a structure package including a default package interface;
    allowing default package interfaces of the encapsulation package to communicate with objects contained in the encapsulation package; and
    eliminating package interfaces of common packages contained in each encapsulation package.

15. The method of claim 14, further comprising:
    identifying all objects and packages that are used by other software components; and
    freezing the all objects and packages that are used by other software components.

16. The method of claim 9, wherein the encapsulation includes disabling server and client properties for each group within the encapsulation package.

17. A computer-readable non-transitory medium stored thereon machine-executable codes that, when executed, performs a method, the method comprising:
    receiving a software component including a layered hierarchy of:
        structure packages containing lower level packages, wherein the structure packages form a root of the layered hierarchy;
        main packages containing lower level packages; and
        common packages each including objects to develop a functionality of a business application;
        wherein the lower level packages include at least one of: the main packages and the common packages; and
        wherein each of the structure packages, main packages, and common packages includes at least one package interface and at least one use access parameter, the at least one package interface and the at least one use access parameter defining visibility and access of respective packages;
    grouping common packages at a same layer into groups according to pre-determined criteria;
    encapsulating each group with an encapsulation package, wherein the encapsulation package is one of a structure package and a main package;
    responsive to the encapsulation, allowing objects within the encapsulation package to communicate directly with one another without checking visibility at respective package interfaces and use access parameters; and
    eliminating at least one of: the at least one package interface and the at least one use access parameter of the common packages in the encapsulation package.

* * * * *